United States Patent [19]
Isobe

[11] Patent Number: 5,471,440
[45] Date of Patent: Nov. 28, 1995

[54] MAGNETOOPTIC APPARATUS WITH INTEGRATED DETECTING ELEMENT PROVIDING SIGNAL WITH HIGH S/N RATIO

[75] Inventor: Tami Isobe, Yokohama, Japan

[73] Assignee: Ricoh Co., Ltd., Tokyo, Japan

[21] Appl. No.: 127,746

[22] Filed: Sep. 27, 1993

[30]  Foreign Application Priority Data

Sep. 29, 1992  [JP]  Japan ................................. 4-260073

[51] Int. Cl.$^6$ ............................... G11B 11/00; G11B 7/00
[52] U.S. Cl. ........................... 369/13; 369/110; 369/112; 385/28; 385/14; 385/43
[58] Field of Search ............................... 369/13, 14, 110, 369/112, 122; 360/59, 114; 365/122; 385/28, 14, 43, 36, 37, 130, 25, 29

[56]  References Cited

U.S. PATENT DOCUMENTS

| | | | |
|---|---|---|---|
| 4,832,428 | 5/1989 | Miyawaki et al. | 385/36 |
| 4,861,128 | 8/1989 | Ishikawa et al. | 369/112 |
| 4,932,743 | 6/1990 | Isobe et al. | 385/14 |
| 4,971,414 | 11/1990 | Funato et al. | 385/14 |
| 4,978,187 | 12/1990 | Minemura et al. | 385/14 |
| 4,991,160 | 2/1991 | Premji | 369/112 |
| 5,208,800 | 5/1993 | Isobe et al. | 369/112 |
| 5,218,582 | 6/1993 | Marchant | 369/14 |
| 5,235,570 | 8/1993 | Kurtz et al. | 369/13 |
| 5,235,589 | 8/1993 | Yokomori et al. | 369/112 |

FOREIGN PATENT DOCUMENTS

| | | |
|---|---|---|
| 64-4706 | 9/1989 | Japan. |
| 64-4707 | 9/1989 | Japan. |

OTHER PUBLICATIONS

Kobayashi et al., "An Optical Waveguide TE-TM Mode Splitter" Appl. Physics Letter vol. 32, No. 5, Mar. 1, 1978, pp. 300–302.

*Primary Examiner*—Ali Neyzari
*Attorney, Agent, or Firm*—Cooper & Dunham

[57]  ABSTRACT

In an apparatus for recording and reading out magnetooptic information an incident light beam polarized in a predetermined direction is modulated by rotating a plane of polarization in accordance with a recording pattern of a magnetooptic information recording medium utilizing magnetooptic Kerr effects. The modulated light beam is detected by a detecting system integrated element to read the recording pattern. The magnetooptic information recording-reading out apparatus has a TE/TM mode separating element of a waveguide type for separating lights in TE and TM modes from each other and disposed in the detecting system integrated element; a waveguide photodetector for detecting light in the TE mode and disposed in the detecting system integrated element; a waveguide photodetector for detecting light in the TM mode and disposed in the detecting system integrated element; and a signal detector for setting outputs $I_{TE}$ and $I_{TM}$ of the waveguide photodetectors for detecting lights in the TE and TM modes to be approximately equal to each other.

4 Claims, 6 Drawing Sheets

MAGNETOOPTIC APPARATUS WITH INTEGRATED DETECTING ELEMENT PROVIDING SIGNAL WITH HIGH S/N RATIO

BACKGROUND OF THE INVENTION

1. Field of the Invention

The present invention relates to an apparatus for recording and reading out magnetooptic information and applied as a recording and reading out apparatus of a magnetooptic disk, a magnetooptic card, a magnetooptic tape, etc.

2. Description of the Related Art

For example, the following five literatures are disclosed as a proposed technique about an apparatus for recording and reading out magnetooptic information as an optical system for detecting a magnetooptic signal.

(1) Trikepps pp. 174–183 in Chapter 5 of "Magnetooptic disk" written by Nagao under the supervision of Imamura in 1986;

(2) Research meeting report of quantum electronics of Electronic communication society of Japan, OQE86-177;

(3) M. Aoki, et.al. "TE/TM mode splitter in a slab waveguide with a tapered transition", MOC' 91 Technical digest E3 60-63;

(4) Japanese Patent Application Laying Open (KOKAI) No. 57-205840;

(5) Japanese Patent Publication (KOKOKU) No. 2-37611;

A general magnetooptic signal detecting optical system for a magnetooptic disk shown in the above first literature is constructed by a beam splitter, an analyzer and a photodetector. The beam splitter is arranged on an optical path of disk-reflecting light to reflect light reflected on the magnetooptic disk. The analyzer is arranged on an optical path of light reflected on the beam splitter to rotate a plane of polarization of this reflected light. The photodetector detects the reflected light transmitted through this analyzer and reads out a magnetooptic reading out signal. This magnetooptic reading out signal is called a magnetooptic signal in the following description.

In the following description, reference numeral $I_0$ designates an intensity of light incident to the analyzer. $\pm \theta k$ designates an angle of rotation of the polarizing plane provided by the magnetooptic disk. $\theta a$ designates an angle of rotation of the analyzer with respect to an extinction axis thereof. $\eta d$ designates a sensitivity of the photodetector. Reference numeral M designates an internal electric current gain as a multiplication factor of the photodetector. Reference numeral S designates a signal component of an output electric current of the photodetector. In this case, the signal component S is provided as follows.

$$S = I_0 \cdot \eta d \cdot M[\sin^2(\theta a + \theta k) - \sin^2(\theta a - \theta k)] \quad (1)$$
$$= I_0 \cdot \eta d \cdot M \cdot \sin 2\theta a \cdot \sin 2\theta k$$
$$\approx I_0 \cdot \eta d \cdot M \cdot \sin 2\theta a \cdot 2\theta k$$

Here, $\theta k \ll 1$ is set.

In detection of the magnetooptic signal, the angle $\theta k$ of rotation of a polarizing plane caused by magnetic Kerr effects is small so that the magnetooptic signal has a small amplitude. Therefore, a magnetooptic differential detecting method is used to increase an S/N ratio in the signal detection.

A magnetooptic signal detecting optical system for a magnetooptic disk using this magnetooptic differential detecting method is constructed by first and second beam splitters, first and second analyzers, first and second photodetectors and a differential amplifier.

The first beam splitter is arranged on an optical path of light reflected on the magnetooptic disk such that one portion of this disk-reflecting light is transmitted through the first beam splitter to a servo error signal detecting system and the other portion of the disk-reflecting light is reflected on the first beam splitter. The second beam splitter is arranged on an optical path of light reflected on the first beam splitter such that one portion of this reflected light is reflected on the second beam splitter and the other portion of this reflected light is transmitted through the second beam splitter. The first analyzer is arranged on an optical path of light transmitted through the second beam splitter. The second analyzer is arranged on an optical path of light reflected on the second beam splitter.

The first photodetector is arranged on an optical path of light transmitted through the first analyzer to photoelectrically convert this light. The second photodetector is arranged on an optical path of light transmitted through the second analyzer to photoelectrically convert this light. The differential amplifier receives a first signal from the first photodetector and a second signal from the second photodetector. The differential amplifier is electrically connected to each of the first and second photodetectors so as to differentially amplify these first and second signals and output a magnetooptic reading out signal. The first and second analyzers are arranged such that extinction axes of the first and second analyzers are perpendicular to each other.

In this case, similar to the above formula (1), a signal component $S_1$ of the first photodetector is provided as follows.

$$S_1 = I_0 \cdot \eta d \cdot M[\sin^2(\theta a + \theta k) - \sin^2(\theta a - \theta k)] \quad (2)$$
$$\approx I_0 \cdot \eta d \cdot M \cdot \sin 2\theta a \cdot 2\theta k$$

A signal component $S_2$ of the second photodetector is provided as follows with respect to light transmitted through each of the analyzers having the perpendicular extinction axes.

$$S_2 = I_0 \cdot \eta d \cdot M[\cos^2(\theta a + \theta k) - \cos^2(\theta a - \theta k)] \quad (3)$$
$$\approx -I_0 \cdot \eta d \cdot M \cdot \sin 2\theta a \cdot 2\theta k$$

A magnetooptic signal is provided as follows by a difference between the signal components $S_1$ and $S_2$ as outputs of the first and second photodetectors.

$$S = S_1 - S_2 \quad (4)$$
$$= I_0 \cdot \eta d \cdot M \cdot \sin 2\theta a \cdot 4\theta k$$

As can be seen from the above formula (4), an amplitude of the magnetooptic signal in the differential signal detection is doubled in comparison with that in the single signal detection provided by the first formula (1). In a differential detecting system, a signal component based on a change in light intensity does not depend on polarization with respect to laser noises, disk noises and medium noises, and is outputted as the same phase component in a magnetooptic signal detecting system using the magnetooptic differential detecting method. Accordingly, signal components based on the change in light intensity are cancelled by calculating a difference therebetween.

An actual magnetooptic signal detecting optical system is constructed by a beam splitter, a ½ wavelength plate, a polarizing beam splitter, first and second photodetectors and a differential amplifier. The beam splitter is arranged on an optical path of light reflected on a magnetooptic disk such that one portion of this reflected light is reflected on the beam splitter. The ½ wavelength plate is arranged on an optical path of polarized light reflected on the beam splitter such that θa is equal to 45° by converting or transforming a plane of vibration of this polarized light. The polarizing beam splitter is arranged on an optical path of light transmitted through the ½ wavelength plate such that this transmitted light is separated into two polarizing light components.

The first photodetector is arranged on an optical path of one of the above two polarizing light components separated by the polarizing beam splitter to detect this one polarizing light component. The second photodetector is arranged on an optical path of the other of the above two polarizing light components separated by the polarizing beam splitter to detect the other polarizing light component. The differential amplifier receives a first signal from the first photodetector and a second signal from the second photodetector. The differential amplifier is electrically connected to each of the first and second photodetectors so as to differentially amplify these first and second signals and output a magnetooptic signal.

θa is set to 45° in the ½ wavelength plate since unpolarized noise components have the same amplitude in the first and second photodetectors and are completely cancelled and a signal amplitude represented by the formula (4) is increased.

A Kerr rotational angle of a plane of polarization caused by magnetic Kerr effects of a magnetooptic material is a small angle such as 1° or less. In the above fourth and fifth references, an S/N ratio is increased by optically increasing the Kerr rotational angle by commonly using the above magnetooptic differential detecting method. In this case, after light is reflected on the beam splitter, the Kerr rotational angle is increased by setting reflectivities of P and S polarized lights of the beam splitter to be different from each other in the above actual detecting optical system.

The magnetooptic signal detecting optical system in a magnetooptic disk pickup at present is constructed by assembling many bulky optical elements into each other as explained with respect to the actual detecting optical system. Accordingly, cost of the magnetooptic signal detecting optical system is increased and a strict assembly accuracy is required for the magnetooptic signal detecting optical system. Therefore, a detecting system integrated device is proposed. In this detecting system integrated device, bulky optical elements and photodetectors are functionally integrated on a silicon substrate.

In accordance with the above second literature, three focusing grating couplers of a face separating type are used as this detecting system integrated device. This detecting system integrated device using the three focusing grating couplers is proposed by Nishihara Institute in Osaka University in Japan. In the above third literature, the detecting system integrated device uses a TE/TM mode splitter having a tapered coupling portion and proposed by the inventors of this patent application. However, in each of these literatures, the detecting system integrated device does not use a means for increasing an S/N ratio in the magnetooptic signal detecting optical system in the above magnetooptic disk pickup at present.

SUMMARY OF THE INVENTION

It is therefore an object of the present invention to provide an apparatus of a detecting system integrated type for recording and reading out magnetooptic information and having an optical system capable of detecting a magnetooptic signal having a high S/N ratio.

In accordance with a first structure of the present invention, the above object can be achieved by an apparatus for recording and reading out magnetooptic information in which an incident light beam polarized in a predetermined direction is modulated by rotating a plane of polarization in accordance with a recording pattern of a magnetooptic information recording medium utilizing magnetooptic Kerr effects and is detected by a detecting system integrated element to read the recording pattern, the magnetooptic information recording-reading out apparatus comprising a TE/TM mode separating element of a waveguide type for separating lights in TE and TM modes from each other and disposed in the detecting system integrated element; a waveguide photodetector for detecting light in the TE mode and disposed in the detecting system integrated element; a waveguide photodetector for detecting light in the TM mode and disposed in the detecting system integrated element; and signal detecting means for setting outputs $I_{TE}$ and $I_{TM}$ of the waveguide photodetectors for detecting lights in the TE and TM modes to be approximately equal to each other.

In accordance with a second structure of the present invention, the signal detecting means for setting the outputs $I_{TE}$ and $I_{TM}$ to be approximately equal to each other is constructed by rotating a polarization direction of the modulated light beam with respect to perpendicular polarization directions of lights in the TE and TM modes in the detecting system integrated element.

In accordance with a third structure of the present invention, the signal detecting means for setting the outputs $I_{TE}$ and $I_{TM}$ to be approximately equal to each other is constructed such that coupling efficiency of the modulated light beam in coupling to the detecting system integrated element depends on a polarization direction of the modulated light beam.

In accordance with a fourth structure of the present invention, the signal detecting means for setting the outputs $I_{TE}$ and $I_{TM}$ to be approximately equal to each other is constructed by setting waveguide transmission losses in the TE and TM modes to be different from each other in the detecting system integrated element.

In accordance with a fifth structure of the present invention, the signal detecting means for setting the outputs $I_{TE}$ and $I_{TM}$ to be approximately equal to each other is constructed such that coupling efficiency of the light beam in the TE mode coupled to the waveguide photodetector for detecting light in the TE mode is different from that of the light beam in the TM mode coupled to the waveguide photodetector for detecting light in the TM mode in the detecting system integrated element.

In accordance with a sixth structure of the present invention, the polarization direction of the modulated light beam is inclined by an angle except for 45° with respect to perpendicular polarization directions of lights in the TE and TM modes in the detecting system integrated element.

In the above magnetooptic information recording-reading out apparatus of the present invention, the TE/TM mode splitter of a waveguide type as a polarizing separating element, the waveguide photodetector for detecting light in the TE mode and the waveguide photodetector for detecting light in the TM mode are integrated on one substrate in comparison with a general magnetooptic information recording-reading out apparatus as a magnetooptic signal detecting optical system in which bulky optical elements are assembled. Accordingly, the magnetooptic information recording-reading out apparatus is compact and light in weight and is easily assembled and adjusted in operation. Further, in comparison with the magnetooptic signal detecting optical system using a general detecting system integrated element, the present invention has a signal detecting means for setting an output $I_{TE}$ of the waveguide photodetector for detecting light in the TE mode to be approximately equal to an output $I_{TM}$ of the waveguide photodetector for detecting light in the TM mode. Accordingly, it is possible to obtain a magnetooptic signal having a high S/N ratio.

Further objects and advantages of the present invention will be apparent from the following description of the preferred embodiments of the present invention as illustrated in the accompanying drawings.

BRIEF DESCRIPTION OF THE DRAWINGS

FIG. 1b is a plan view of the detecting system integrated element shown in FIG. 1a;

DESCRIPTION OF THE PREFERRED EMBODIMENTS

The preferred embodiments of an apparatus for recording and reading out magnetooptic information in the present invention will next described in detail with reference to the accompanying drawings.

A general technique of the magnetooptic information recording-reading out apparatus will first be explained by using FIGS. 6 to 8 to easily understand the present invention.

Figure 6:
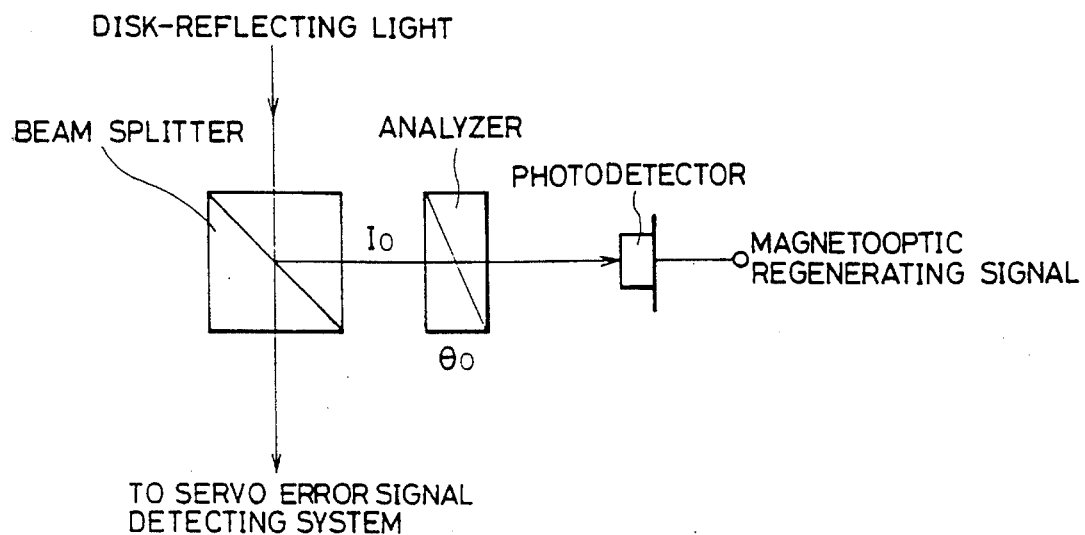
FIG. 6 is a view showing the basic construction of a magnetooptic signal detecting optical system for a magnetooptic disk in one example of a general technique of this detecting optical system.

FIG. 6 shows the basic construction of a general magnetooptic signal detecting optical system for a magnetooptic disk. This magnetooptic signal detecting optical system is shown in the above-mentioned first literature.

In FIG. 6, light is reflected on a magnetooptic disk and a beam splitter. This light is then transmitted through an analyzer so that rotation of a plane of polarization is converted to a change in light intensity. A photodetector thus obtains a magnetooptic reading out signal. This magnetooptic reading out signal is simply called a magnetooptic signal in the following description. Here, reference numeral $I_0$ designates an intensity of light incident to the analyzer. $\pm \theta k$ designates an angle of rotation of the polarizing plane provided by the magnetooptic disk. $\theta a$ designates an angle of rotation of the analyzer with respect to an extinction axis thereof. $\eta d$ designates a sensitivity of the photodetector. Reference numeral M designates an internal electric current gain as a multiplication factor of the photodetector. Reference numeral S designates a signal component of an output electric current of the photodetector. In this case, the signal component S is provided as follows.

$$
\begin{aligned}
S &= I_0 \cdot \eta d \cdot M[\sin^2(\theta a + \theta k) - \sin^2(\theta a - \theta k)] \\
&= I_0 \cdot \eta d \cdot M \cdot \sin 2\theta a \cdot \sin 2\theta k \\
&\approx I_0 \cdot \eta d \cdot M \cdot \sin 2\theta a \cdot 2\theta k
\end{aligned}
\qquad (1)
$$

Here, $\theta k \ll 1$ is set.

In detection of the magnetooptic signal, the angle $\theta k$ of rotation of the polarizing plane caused by magnetic Kerr effects is small so that the magnetooptic signal has a small amplitude. Therefore, a magnetooptic differential detecting method is used to increase an S/N ratio in the signal detection. FIG. 7 shows the basic construction of a magnetooptic signal detecting optical system for a magnetooptic disk using the magnetooptic differential detecting method.

Figure 7:
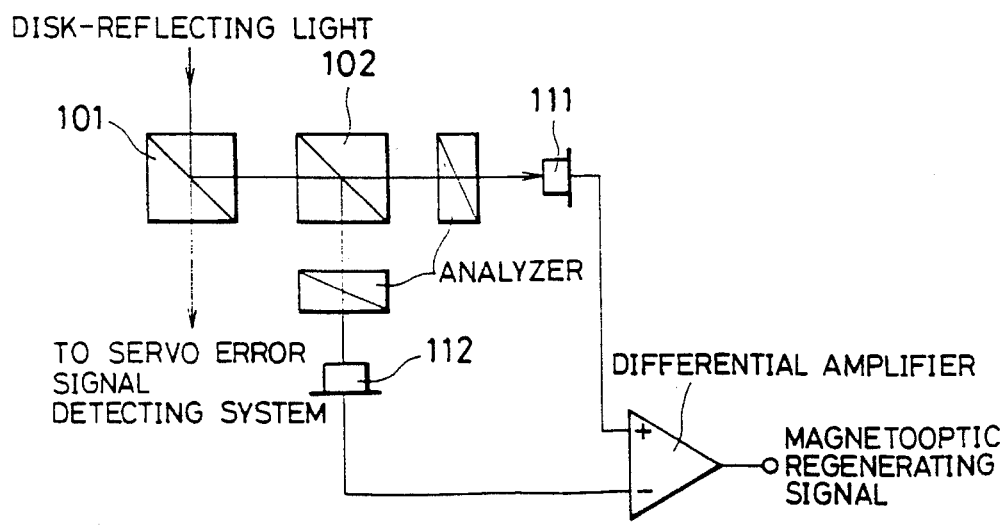
FIG. 7 is a view showing the basic construction of a magnetooptic signal detecting optical system for a magnetooptic disk using a magnetooptic differential detecting method in another example of the general technique of the detecting optical system.

In FIG. 7, light is reflected on a magnetooptic disk and a first beam splitter 101. This light is then divided into two light portions by a second beam splitter 102. Each of the two light portions is transmitted through an analyzer and is photoelectrically converted by each of first and second photodetectors 111 and 112. At this time, the analyzers are arranged such that extinction axes of the analyzers are perpendicular to each other. Outputs of the photodetectors 111 and 112 are differentially amplified so that a magnetooptic signal is obtained.

In this case, similar to the above formula (1), a signal omponent $S_1$ of the first photodetector 111 is provided as follows.

$$S_1 = I_0 \cdot \eta d \cdot M[\sin^2(\theta a + \theta k) - \sin^2(\theta a - \theta k)] \quad (2)$$
$$\approx I_0 \cdot \eta d \cdot M \cdot \sin 2\theta a \cdot 2\theta k$$

A signal component $S_2$ of the second photodetector 112 is provided as follows with respect to light transmitted through each of the analyzers having the perpendicular extinction axes.

$$S_2 = I_0 \cdot \eta d \cdot M[\cos^2(\theta a + \theta k) - \cos^2(\theta a - \theta k)] \quad (3)$$
$$\approx -I_0 \cdot \eta d \cdot M \cdot \sin 2\theta a \cdot 2\theta k$$

A magnetooptic signal is provided as follows by a difference between the signal components $S_1$ and $S_2$ as outputs of the first and second photodetectors.

$$S = S_1 - S_2 \quad (4)$$
$$= I_0 \cdot \eta d \cdot M \cdot \sin 2\theta a \cdot 4\theta k$$

As can be seen from the above formula (4), an amplitude of the magnetooptic signal in the differential signal detection is doubled in comparison with that in the single signal detection provided by the first formula (1). In a differential detecting system, a signal component based on a change in light intensity does not depend on polarization with respect to laser noises, disk noises and medium noises, and is outputted as the same phase component in the magnetooptic signal detecting system using the magnetooptic differential detecting method in FIG. 7. Accordingly, signal components based on the change in light intensity are cancelled by calculating a difference therebetween.

Figure 8:
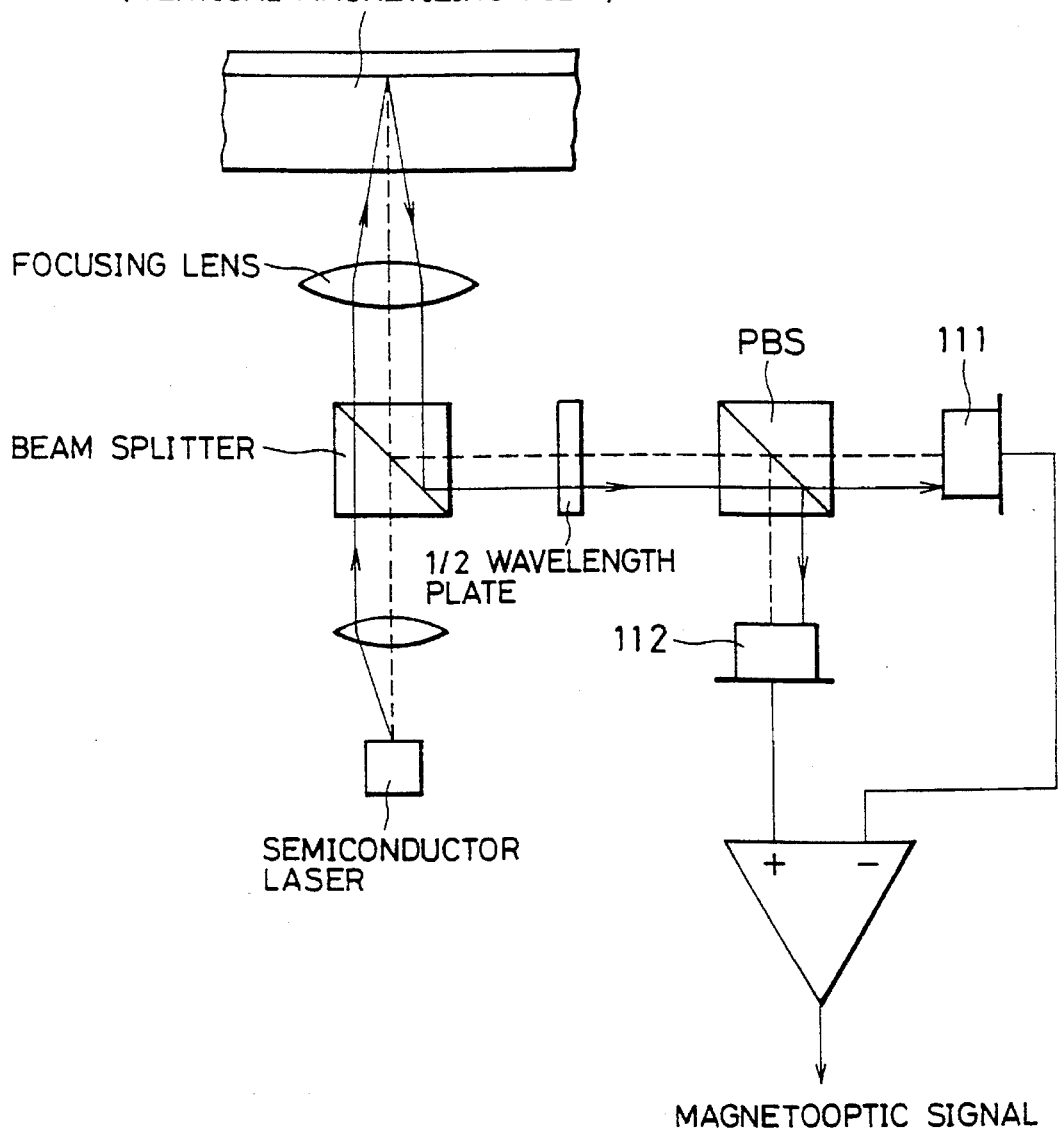
FIG. 8 is a view showing the construction of an actual magnetooptic signal detecting optical system for a magnetooptic disk in another example of the general technique of the detecting optical system.

In the actual magnetooptic signal detecting optical system shown in FIG. 8, light is reflected on a magnetooptic disk and a beam splitter. A plane of vibration of polarized light is converted or transformed by a ½ wavelength plate such that a rotational angle θ a of this vibrational plane is equal to 45°. This light is polarized and separated by a polarizing beam splitter (PBS). a is set to 45° in the ½ wavelength plate since unpolarized noise components have the same amplitude in first and second photodetectors 111, 112 and are completely cancelled and a signal amplitude represented by the formula (4) is increased.

A Kerr rotational angle of a plane of polarization caused by magnetic Kerr effects of a magnetooptic material is a small angle such as 1° or less. In the above fourth and fifth references, an S/N ratio is increased by optically increasing the Kerr rotational angle by commonly using the above magnetooptic differential detecting method. In this case, after light is reflected on the beam splitter, the Kerr rotational angle is increased by setting reflectivities of P and S polarized lights of the beam splitter to be different from each other in the above actual detecting optical system shown in FIG. 8.

In this patent specification, $I_{TE}$ designates an output of a waveguide photodetector for detecting light in a TE mode. $I_{TM}$ designates an output of a waveguide photodetector for detecting light in a TM mode. Further, a signal detecting means for setting these outputs $I_{TE}$ and $I_{TM}$ to be approximately equal to each other is constructed by an optical system in which these outputs $I_{TE}$ and $I_{TM}$ are set to be approximately equal to each other.

The construction and operation of an apparatus for recording and reading out magnetooptic information in the present invention will next be explained in detail with reference to FIGS. 1 to 5.

Figure 1A:
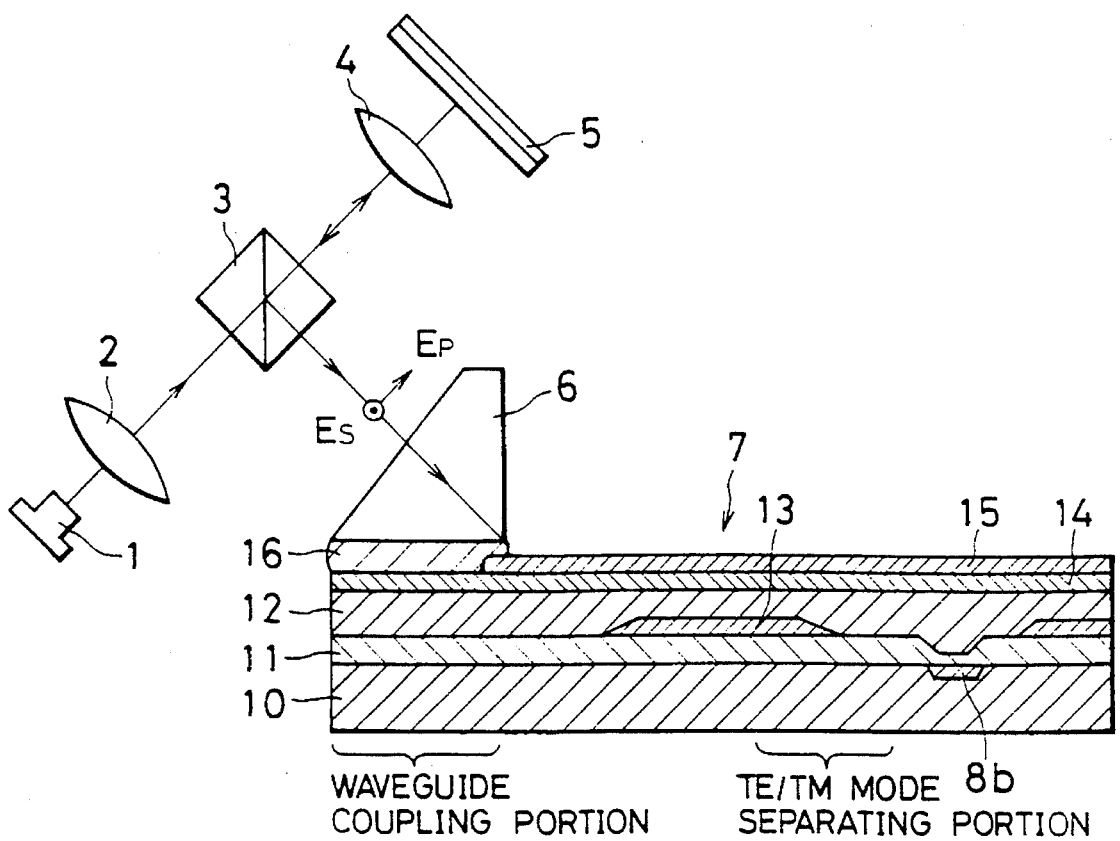
FIG. 1a is a view for explaining the construction of an apparatus for recording and reading out magnetooptic information and having a first structure in accordance with one embodiment of the present invention, and shows a light source, a light convergent optical system for converging light from the light source onto a magnetooptic information recording medium, and the cross section of a detecting system integrated element for detecting reflected light from this magnetooptic information recording medium.
Figure 1B:
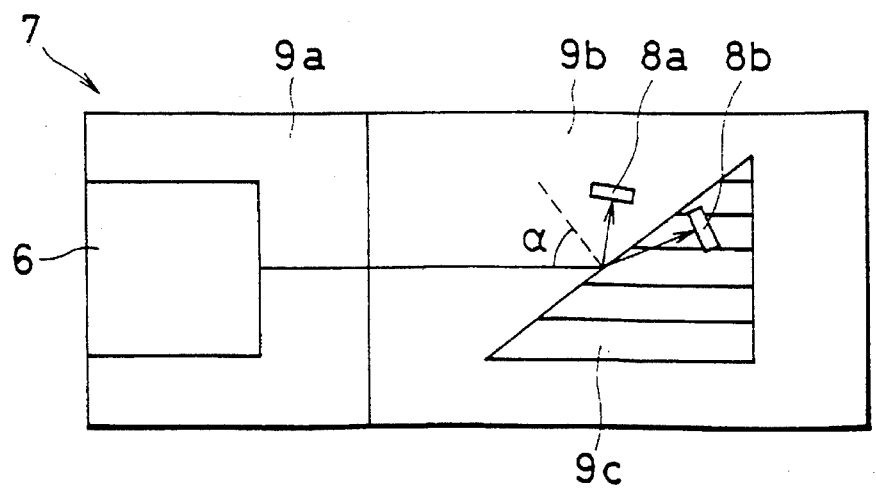

FIG. 1a is a view for explaining the construction of an apparatus for recording and reading out magnetooptic information and having a first structure in accordance with one embodiment of the present invention. FIG. 1a shows a light source and a light convergent optical system for converging light from the light source onto a magnetooptic information recording medium. FIG. 1a also shows the cross section of a detecting system integrated element for detecting reflected light from this magnetooptic information recording medium. FIG. 1b is a plan view of the detecting system integrated element shown in FIG. 1a.

In FIG. 1b, a second optical waveguide 9b as an optical waveguide region is shown by black dots on a white ground. A first optical waveguide 9a as an optical waveguide region is shown by a white ground portion having no black dots. In the following description, $Ne_1$ designates an effective refractive index of the first optical waveguide 9a in $TE_0$ mode. $Nm_1$ designates an effective refractive index of the first optical waveguide 9a in $TM_0$ mode. $Ne_2$ designates an effective refractive index of the second optical waveguide 9b in $TE_0$ mode. $Nm_2$ designates an effective refractive index of the second optical waveguide 9b in $TM_0$ mode. The effective refractive indices $Ne_1$ and $Nm_1$ are approximately equal to each other. The effective refractive indices $Ne_2$ and $Nm_2$ are different from each other.

In FIG. 1a, reference numerals 1, 2 and 3 respectively designate a light source, a collimator lens and a beam splitter. Reference numerals 4, 5, 6 and 7 respectively designate an objective lens, a magnetooptic information recording medium, a prism coupler and a detecting system integrated element. In FIG. 1b, reference numerals 8a, 8b and 9c respectively designate a photodetector, a photodetector and a third optical waveguide.

In FIGS. 1a and 1b, light is emitted from the light source 1 and is converged by the collimator lens 2. This light is then converged by the objective lens 4 onto the magnetooptic information recording medium 5 through the beam splitter 3. This converged light is reflected as return light on the magnetooptic information recording medium 5. This return light is again converged by the objective lens 4 and is then reflected on the beam splitter 3. The reflected light is incident to the prism coupler 6 and is coupled to the first optical waveguide 9a so that waveguided light is obtained. At this time, the electric field of a polarized light component is vibrated in a direction of Es in FIG. 1a just before the prism coupler 6. This polarized light component is set to light in the TE mode in a waveguide. The electric field of a polarized light component is vibrated in a direction of Ep in FIG. 1a just before the prism coupler 6. This polarized light component is set to light in the TM mode in the waveguide.

The waveguided light transmitted through the first optical waveguide 9a is then coupled to the second optical waveguide 9b. The waveguided light is next separated into lights in the TE and TM modes by a TE/TM mode separating element portion for reflecting light in the TE mode thereon and refracting light in the TM mode. Thereafter, the light in the TE mode is detected by the photodetector 8a. The light in the TM mode is detected by the photodetector 8b.

The lights in the TE and TM modes are separated from each other as follows in principle in the TE/TM mode separating element portion.

The TE/TM mode separating element portion is constructed by the second optical waveguide 9b, the third optical waveguide 9c, and a second coupling portion from the second optical waveguide 9b to the third optical waveguide 9c. In the second coupling portion, the thickness of an optical waveguide layer is gently changed in accordance with a wavelength of light. In the following description, $Ne_3$ designates an effective refractive index of the third optical waveguide 9c in $TE_0$ mode. $Nm_3$ designates an effective refractive index of the third optical waveguide 9c in $TM_0$ mode. $Ne_2$, $Nm_2$, $Ne_3$ and $Nm_3$ satisfy the following relation.

$Ne_2 > Ne_3$ $Nm_2 > Nm_3$ $Nm_3/Nm_2 > Ne_3/Ne_2$

Accordingly, light in the $TE_0$ mode is totally reflected on the second coupling portion and is detected by the photodetector 8a if the incident angle $\alpha$ of a light beam waveguided to the mode separating element portion and incident to the second coupling portion is set to an angle between a critical angle $\theta e = \sin(Ne_3/Ne_2)$ in the $TE_0$ mode in the second coupling portion and a critical angle $\theta m = \sin(Nm_3/Nm_2)$ in the $TM_0$ mode. Light in the $TM_0$ mode is refracted and transmitted to the third optical waveguide 9c and is detected by the photodetector 8b.

Figure 2:
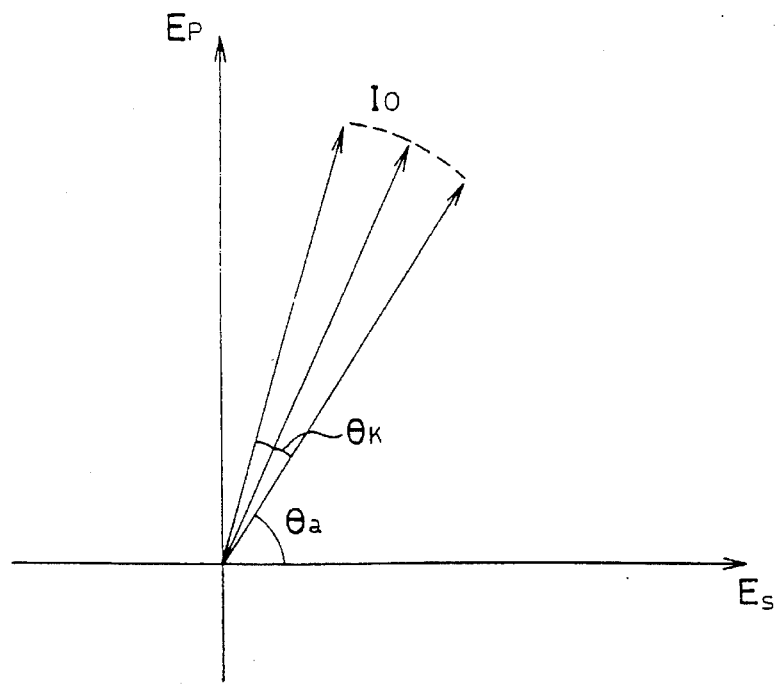
FIG. 2 is a view for explaining a polarization direction of reflected light from the magnetooptic recording medium and an angle of rotation of a polarizing plane caused by magnetic Kerr effects.

As shown in FIG. 2, a polarizing direction of the reflected light from the magnetooptic information recording medium 5 is rotated by an angle $\theta a$ with respect to the Es-direction just before the prism coupler 6. In this case, an angle of rotation of this polarization direction caused by magnetic Kerr effects is set to $\pm \theta k$. In the following description, $I_0$ designates an intensity of incident light just before this light is incident to the prism coupler 6. Reference numeral $\gamma$ designates coupling efficiency of this light transmitted to a waveguide of the prism coupler 6. Reference numeral $\delta$ designates a waveguide transmission loss. Reference numeral $\zeta$ designates coupling efficiency of waveguided light transmitted to a waveguide photodetector. $\eta$ d designates a sensitivity of the waveguide photodetector. Reference numeral M designates an internal electric current gain as a multiplication factor. In this case, a signal component S of an output electric current of the waveguide photodetector is provided as follows.

$$S = I_0 \cdot \gamma \cdot \delta \cdot \zeta \cdot \eta d \cdot M[\sin^2(\theta a + \theta k) - \sin^2(\theta a - \theta k)] \quad (5)$$
$$= I_0 \cdot \gamma \cdot \delta \cdot \zeta \cdot \eta d \cdot M \cdot \sin 2\theta a \cdot \sin 2\theta k$$

Here, $\theta k \ll 1$ is set.

The coupling efficiency $\gamma$ of light transmitted to the waveguide of the prism coupler, the waveguide transmission loss $\delta$, and the coupling efficiency $\zeta$ of waveguided light transmitted to the waveguide photodetector respectively depend on polarization. Namely, the coupling efficiency $\gamma$, the waveguide transmission loss $\delta$ and the coupling efficiency $\zeta$ in the TE mode is different from those in the TM mode. In the following description, subscript e is added to these values in the TE mode and subscript m is added to these values in the TM mode. The waveguide transmission loss is usually shown by a unit of dB/cm. However, here, the waveguide transmission loss shows a ratio of a quantity of light just before coupling to the waveguide photodetector to a quantity of light just after coupling to a waveguide.

In this case, similar to the formula (5), a signal component Sm of the photodetector 8b for detecting light in the TM mode is provided as follows.

$$Sm = I_0 \cdot \gamma m \cdot \delta m \cdot \zeta m \cdot \eta d \cdot M[\sin^2(\theta a + \theta k) - \sin^2(\theta a - \theta k)] \quad (6)$$
$$= I_0 \cdot \gamma m \cdot \delta m \cdot \zeta m \cdot \eta d \cdot M \cdot \sin 2\theta a \cdot \sin 2\theta k$$

In contrast to this, a signal component Se of the photodetector 8a for detecting light in the TE mode is provided as follows.

$$Se = I_0 \cdot \gamma e \cdot \delta e \cdot \zeta e \cdot \eta d \cdot M[\cos^2(\theta a + \theta k) - \cos^2(\theta a - \theta k)] \quad (7)$$
$$= -I_0 \cdot \gamma e \cdot \delta e \cdot \zeta e \cdot \eta d \cdot M \cdot \sin 2\theta a \cdot \sin 2\theta k$$

DC-components He and Hm of outputs of the photodetectors 8a and 8b are represented as follows.

$$Hm = I_0 \cdot \gamma m \cdot \delta m \cdot \zeta m \cdot \eta d \cdot M \cdot \sin^2 \theta a \quad (8)$$

$$He = I_0 \cdot \gamma e \cdot \delta e \cdot \zeta e \cdot \eta d \cdot M \cdot \cos^2 \theta a \quad (9)$$

Accordingly, the modulation degree of a magnetooptic differential signal with respect to the DC-components is represented by the following formula (10).

$$\frac{Sm - Se}{Hm + He} = \frac{I_0 \cdot \gamma m \cdot \delta m \cdot \zeta m \cdot \eta d \cdot M \cdot \sin 2\theta a \cdot \sin 2\theta k + I_0 \cdot \gamma e \cdot \delta e \cdot \zeta e \cdot \eta d \cdot M \cdot \sin 2\theta a \cdot \sin 2\theta k}{I_0 \cdot \gamma m \cdot \delta m \cdot \zeta m \cdot \eta d \cdot M \cdot \sin^2 \theta a + I_0 \cdot \gamma e \cdot \delta e \cdot \zeta e \cdot \eta d \cdot M \cdot \cos^2 \theta a} \quad (10)$$

Here, when $\gamma m \cdot \delta m \cdot \zeta m = Xm$ and $\gamma e \cdot \delta e \cdot \zeta e = Xe$ are set, the following formula (11) is obtained.

$$\frac{Sm - Se}{Hm + He} = \frac{2(1 + (Xe/Xm))\tan\theta a \cdot \sin 2\theta k}{\tan^2 \theta a + (Xe/Xm)} \quad (11)$$

When this formula (11) is partially differentiated with respect to $\theta a$, the following formula (12) is obtained.

$$\partial \left( \frac{Sm - Se}{Hm + He} \right) / \partial \theta a = \quad (12)$$

$$\frac{2(1 + (Xe/Xm)) \cdot \sin 2\theta k \cdot ((Xe/Xm) - \tan^2 \theta a)}{\cos^2 \theta a \cdot (\tan^2 \theta a + (Xe/Xm))^2}$$

Accordingly, the modulation degree is maximum when $\theta a$ satisfies the following conditional formula (13).

$$\tan^2 \theta a = Xe/Xm \quad (13)$$

If the formula (13) is substituted into the formulas (8) and (9), it should be understood that this formula (13) is a condition for setting the DC-components He and Hm of outputs of the photodetectors 8a and 8b to be equal to each other. Accordingly, a magnetooptic signal having a high modulation degree, i.e., a high S/N ratio can be obtained if a signal detecting means for setting the output of a waveguide photodetector for detecting light in the TE mode and the output of a waveguide photodetector for detecting light in the TM mode to be approximately equal to each other is arranged in the magnetooptic information recording-reading out apparatus. Therefore, this signal detecting means is arranged in a first structure of the present invention.

The next description relates to this signal detecting means for setting the output of a waveguide photodetector for detecting light in the TE mode and the output of a waveguide photodetector for detecting light in the TM mode to be approximately equal to each other.

It is sufficient to satisfy the formula (13) to set these outputs to be approximately equal to each other. The formula (13) is rewritten as follows.

$$\tan^2\theta a = (\gamma e \cdot \delta e \cdot \zeta e)/(\gamma m \cdot \delta m \cdot \zeta m)$$

As can be seen from this rewritten formula, the signal detecting means is constructed by the following four structures.

(1) $\theta a$ is changed so that the polarizing direction of a modulated light beam is rotated in accordance with a second structure of the present invention.

(2) The coupling efficiency $\gamma$ of light transmitted to the waveguide of the prism coupler in the TE mode is set to be different from that in the TM mode in accordance with a third structure of the present invention.

(3) The waveguide transmission loss $\delta$ in the TE mode is set to be different from that in the TM mode in accordance with a fourth structure of the present invention.

(4) The coupling efficiency $\zeta$ of waveguided light transmitted to the waveguide photodetector in the TE mode is set to be different from that in the TM mode in accordance with a fifth structure of the present invention.

When $\theta a$ is set to an angle except for 45° and each of the above third to fifth structures is used as the signal detecting means, the modulation degree is amplified as follows in accordance with a sixth structure of the present invention.

Namely, when the formula (13) is substituted into the formula (11) representing the modulation degree, the following formula (14) is obtained.

$$\frac{Sm - Se}{Hm + He} = \frac{(1 + (Xe/Xm)) \cdot (Xe/Xm)^{1/2} \sin 2\theta k}{(Xe/Xm)} \quad (14)$$

When $(Xe/Xm)^{1/2}$ is set to y and this formula (14) is partially differentiated with respect to y, the following formula (15) is obtained.

$$\partial \left( \frac{Sm - Se}{Hm + He} \right) / \partial y = \frac{(y - 1)(y + 1)\sin 2\theta k}{y^2} \quad (15)$$

It should be understood from this formula (15) that the modulation degree is minimum when y= 1. Namely, the modulation degree in the case of Xe≠Xm is amplified in comparison with that in the case of Xe= Xm.

The second to sixth structures of the present invention will next be explained by using concrete examples.

One concrete example of the detecting system integrated element 7 will first be described with reference to FIGS. 1a and 1b. In FIG. 1a, a waveguide photodetector 8a for detecting light in a TE mode and a waveguide photodetector 8b for detecting light in a TM mode are formed on a silicon substrate 10. A buffer layer 11 is formed on these waveguide photodetectors 8a and 8b. An optical waveguide layer 12 constitutes a core layer of a first optical waveguide 9a. An optical waveguide layer 13 constitutes a core layer of a second optical waveguide 9b. A first gap layer 14 and a second gap layer 15 for adjusting coupling efficiency of light transmitted to each of waveguides are formed in the shape of a film on the optical waveguide layers 12 and 13. A prism 6 is adhered on to the first gap layer 14 and the second gap layer 15 through a dielectric adhesive agent 16 having a refractive index approximately equal to that of the prism 6. A third optical waveguide 9c has the same layer structure as the first optical waveguide 9a.

A light beam is modulated by the magnetooptic information recording medium 5. $\theta a$ is set to an angle formed between a polarization direction of the modulated light beam and the Es-direction shown in FIG. 1a. In accordance with the second structure of the present invention, this angle $\theta a$ can be changed to rotate the polarization direction by using a jig for rotating the entire detecting system integrated element 7 on an Es-Ep plane in FIG. 1a. Otherwise, this angle $\theta a$ can be changed to rotate the polarization direction by using a polarization direction rotating element, etc. such as a $\lambda/2$ plate just before the detecting system integrated element 7.

Figure 3:
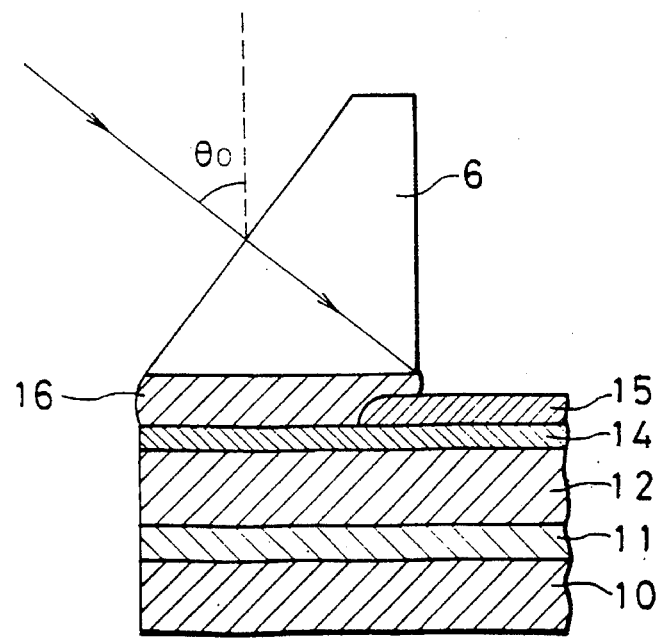
FIG. 3 is an enlarged cross-sectional view of a waveguide coupling portion of the magnetooptic information recording-reading out apparatus shown in FIGS. 1a and 1b.

FIG. 3 is an enlarged view of a waveguide coupling portion shown in FIG. 1a. The light beam modulated by the magnetooptic information recording medium is coupled to the detecting system integrated element 7 in accordance with the third structure of the present invention. In this case, for example, coupling efficiency of this modulated light beam is changed by a refractive index and a thickness of the optical waveguide layer 12, a refractive index and a thickness of the first gap layer 14, an incident angle $\theta_0$ of light incident to the prism 6, etc. Accordingly, if these values are suitably set, coupling efficiencies of the light beam transmitted to a waveguide can be set to be different from each other by the polarization direction of the modulated light beam. Namely, coupling efficiencies $\gamma e$ and $\gamma m$ of the light beam transmitted to the waveguide in the TE and TM modes can be set to be different from each other in accordance with the third structure of the present invention.

Figure 4A:
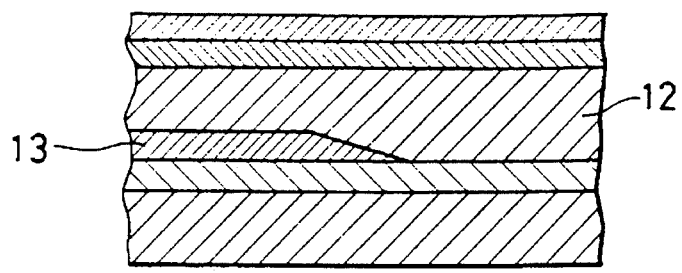
FIG. 4a is a cross-sectional view of a TE/TM mode separating portion of the detecting system integrated element in the magnetooptic information recording-reading out apparatus shown in FIGS. 1a and 1b.
Figure 4B:
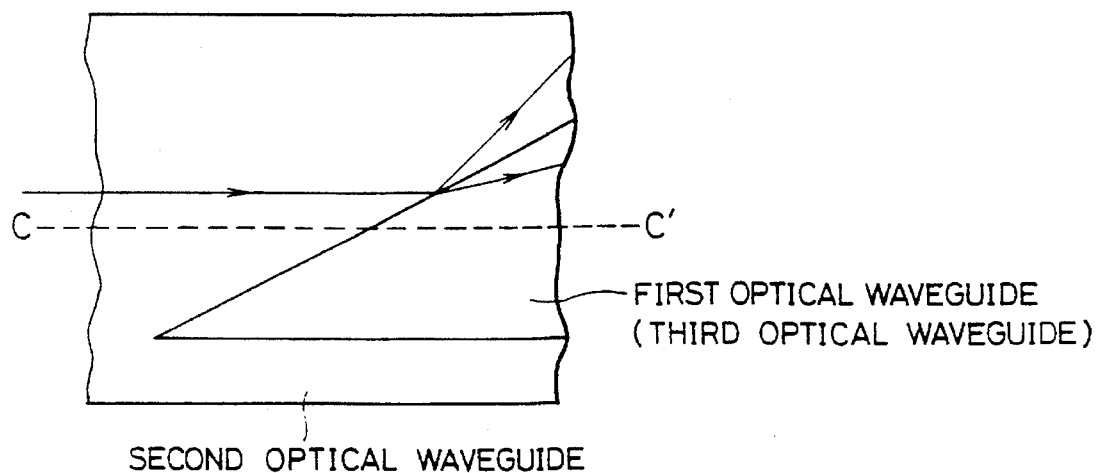
FIG. 4b is a plan view of the TE/TM mode separating portion of the detecting system integrated element in the magnetooptic information recording-reading out apparatus shown in FIGS. 1a and 1b.

FIGS. 4a and 4b are enlarged views of the TE/TM mode separating element portion shown in FIGS. 1a and 1b. FIG. 4a is a cross-sectional view of the TE/TM mode separating element portion. FIG. 4b is a plan view of the TE/TM mode separating element portion. First, light is waveguided to the second optical waveguide 9b in each of the TE and TM modes. The waveguided light in the TE mode is totally reflected on a coupling portion between the second optical waveguide 9b and the first optical waveguide 9a and is then waveguided through the second optical waveguide 9b. The waveguided light in the TE mode is also totally reflected on a tapered coupling portion between the second optical waveguide 9b and the third optical waveguide 9c and is then waveguided through the second optical waveguide 9b. In contrast to this, all the light in the TM mode is transmitted through these coupling portions and is then waveguided through the first and third optical waveguides 9a and 9c. The refractive index or thickness of the optical waveguide layer 12 of each of the first and third optical waveguides 9a and 9c is different from that of the optical waveguide layer 13 of the second optical waveguide 9b. Accordingly, in accordance with the fourth structure of the present invention, a waveguide transmission loss $\delta e$ of light in the TE mode can be easily set to be different from a waveguide transmission loss $\delta m$ of light in the TM mode. In this case, the waveguide transmission loss is set to a ratio of a quantity of light just before coupling to a waveguide photodetector to a quantity of light just after coupling to a waveguide.

Figure 5A:
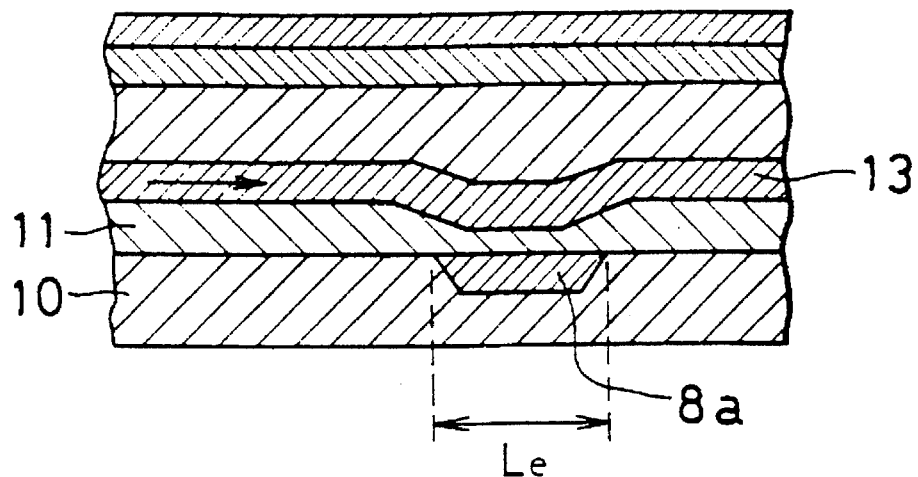
FIG. 5a is a cross-sectional view of a waveguide photodetector for detecting light in a TE mode in the detecting system integrated element in the magnetooptic information recording-reading out apparatus shown in FIGS. 1a and 1b.
Figure 5B:
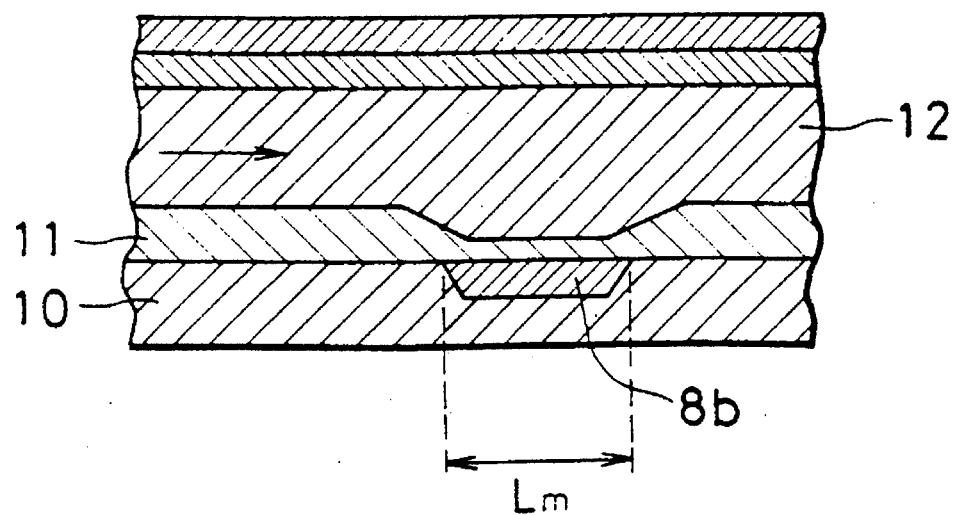
FIG. 5b is a cross-sectional view of a waveguide photodetector for detecting light in a TM mode in the detecting system integrated element in the magnetooptic information recording-reading out apparatus shown in FIGS.1a and 1b.

FIG. 5a is an enlarged view of a cross section of the waveguide photodetector 8a. FIG. 5b is an enlarged view of a cross section of the waveguide photodetector 8b. Coupling efficiency $\zeta$ of waveguided light coupled to the waveguide photodetector depends on a thickness of the buffer layer 11 on the photodetector and lengths Le, Lm of the photodetector. Accordingly, in accordance with the fifth structure of the present invention, coupling efficiency $\zeta e$ in the TE mode can be set to be different from coupling efficiency $\zeta m$ in the TM mode by setting the thickness of the buffer layer 11 on the waveguide photodetector 8a to be different from the thickness of the buffer layer 11 on the waveguide photodetector 8b. Otherwise, the coupling efficiency ζe in the TE mode can be set to be different from the coupling efficiency ζm in the TM mode by changing the lengths Le and Lm.

As mentioned above, in the signal detection means, an output of the waveguide photodetector 8a for detecting light in the TE mode is set to be approximately equal to an output of the waveguide photodetector 8b for detecting light in the TM mode. These contents mean that the following relation or formula is formed.

$\tan^2\theta a = (\gamma e \cdot \delta e \cdot \zeta e)/(\gamma m \cdot \delta m \cdot \zeta m)$ If this formula is satisfied, one, two or three of the coupling efficiency γ of light coupled to the waveguide, the waveguide transmission loss δ, and the coupling efficiency ζ of waveguided light coupled to the waveguide photodetector in the TE mode may be set to be different from those in the TM mode. θa=45° is formed when the coupling efficiency γ, the waveguide transmission loss δ and the coupling efficiency ζ in the TE mode are equal to those in the TM mode.

In the following description, for example, a refractive index n and a thickness d of each of the above layers in FIG. 1a, etc. are concretely set as follows.

wavelength: 633 nm substrate 10: silicon (n= 3.858–0.018i)

buffer layer 11: $SiO_2$ ($n_b$=1.460, $d_b$= 1.000 μm) formed as a film by using thermal oxidation optical waveguide layer 12: SiON ($n_f$= 1.530, $d_f$= 1.500 μm) formed as a film by CVD optical waveguide layer 13: SiN ($n_f$= 1.860, $d_f$= 0.300 μm) formed as a film by CVD first gap layer 14: $SiO_2$ ($n_{g1}$=1.470, $d_{g1}$= 0.500 μm) formed as a film by sputtering second gap layer 15: OCD ($d_{g2}$= 0.700 μm) $SiO_2$ coating film manufactured by e.g., TOKYO APPLIED CHEMICAL in Japan prism 6: optical glass having high refractive index ($n_p$= 1.800)

dielectric adhesive agent 16: optically transparent material having high refractive index such as polyimide resin manufactured as pyralin 2555 ($n_a$= 1.720) by e.g., Dupont Cooperation In this case, effective refractive indices of the first optical waveguide 9a in $TE_0$ and $TM_0$ modes are respectively set to 1.517 and 1.517. In each of these modes, the coupling efficiency γ of light coupled to a waveguide of the prism coupler 6 is equal to 80%.

The coupling efficiency ζ of waveguided light coupled to a waveguide photodetector in the TE mode is different from that in the TM mode. If the coupling efficiencies ζe and ζm in the TE and TM mode are set to satisfy the following relation with respect to the waveguide transmission loss δ, $(\delta e \cdot \zeta e)/(\delta m \cdot \zeta m) \approx 2.04$ the above formula (13) is formed when θa is set to 55°. Namely, a DC-component He of an output of the waveguide photodetector 8a for detecting light in the TE mode is equal to a DC-component Hm of an output of the waveguide photodetector 8b for detecting light in the TM mode.

At this time, when θk=45° is set, the modulation degree represented by the formula (11) is calculated and provided as follows.

$$\frac{Sm - Se}{Hm + He} = \frac{2(1 + (Xe/Xm))\tan\theta a \cdot \sin 2\theta k}{\tan^2\theta a + (Xe/Xm)}$$

$$\approx 0.037$$

Accordingly, the modulation degree is equal to about 3.7%. This value of the modulation degree is clearly larger than a modulation degree value of 3.5% obtained when Xe= Xm is set and θa is equal to 45°. Therefore, the sixth structure of the present invention is used in the magnetooptic information recording-reading out apparatus.

This modulation degree is increased as a difference between Xe and Xm is increased when θa, Xe and Xm satisfy the formula (13). However, when the difference between Xe and Xm is excessively increased, a difference between noise components of light outputs in the TE and TM modes is increased in proportion to the difference between Xe and Xm. Therefore, the same phase component having no polarization cannot be removed by providing a differential signal so that the S/N ratio of a magnetooptic signal is reduced. Accordingly, it is not preferable to excessively increase the difference between Xe and Xm.

As mentioned above, in a magnetooptic information recording-reading out apparatus having a first structure of the present invention, a TE/TM mode splitter of a waveguide type as a polarizing separating element, a waveguide photodetector for detecting light in a TE mode and a waveguide photodetector for detecting light in a TM mode are integrated on one substrate in comparison with a general magnetooptic information recording-reading out apparatus as a magnetooptic signal detecting optical system in which bulky optical elements are assembled. Accordingly, the magnetooptic information recording-reading out apparatus is compact and light in weight and is easily assembled and adjusted in operation. Further, in comparison with the magnetooptic signal detecting optical system using a general detecting system integrated element, the present invention has a signal detecting means for setting an output $I_{TE}$ of the waveguide photodetector for detecting light in the TE mode to be approximately equal to an output $I_{TM}$ of the waveguide photodetector for detecting light in the TM mode. Accordingly, it is possible to obtain a magnetooptic signal having a high S/N ratio.

In accordance with a second structure of the magnetooptic information recording-reading out apparatus, the signal detecting means for setting the outputs $I_{TE}$ and $I_{TM}$ to be approximately equal to each other is constructed by rotating a polarization direction of the light beam modulated by the magnetooptic information recording medium with respect to perpendicular polarization directions of lights in the TE and TM modes in the detecting system integrated element. Accordingly, it is possible to adjust an operation of the signal detecting means at an assembly time thereof such that a magnetooptic signal having a designed high S/N ratio is obtained even when no detecting system integrated element can be manufactured as designed by an error in manufacture thereof.

In accordance with a third structure of the magnetooptic information recording-reading out apparatus, coupling efficiency of the modulated light beam coupled to the detecting system integrated element in the TE mode is set to be different from that in the TM mode in the signal detecting means for setting the above $I_{TE}$ and $I_{TM}$ to be approximately equal to each other. In this third structure, this coupling efficiency depends on an incident angle of the light beam in addition to a material (refractive index) and a thickness of an optical waveguide so that a degree of freedom in design is increased.

In accordance with a fourth structure of the magnetooptic information recording-reading out apparatus, the signal detecting means for setting the outputs $I_{TE}$ and $I_{TM}$ to be approximately equal to each other is constructed by setting waveguide transmission losses in the TE and TM modes to be different from each other in the detecting system integrated element. In this detecting system integrated element, the lights in the TE and TM modes are separated from each other by the TE/TM mode splitter of a waveguide type and are respectively transmitted through different optical waveguides. Accordingly, the waveguide transmission tosses in the TE and TM modes are easily set to be different from each other so that a magnetooptic signal having a high S/N ratio can be obtained.

In accordance with a fifth structure of the magnetooptic information recording-reading out apparatus, the signal detecting means for setting the outputs $I_{TE}$ and $I_{TM}$ to be approximately equal to each other is constructed such that coupling efficiency of the light beam in the TE mode coupled to the waveguide photodetector for detecting light in the TE mode is different from that of the light beam in the TM mode coupled to the waveguide photodetector for detecting light in the TM mode in the detecting system integrated element. In this fifth structure, it is possible to obtain a magnetooptic signal having less noises caused by scattered light within the detecting system integrated element.

In accordance with a sixth structure of the magnetooptic information recording-reading out apparatus, the polarization direction of the modulated light beam in each of the third to fifth structures is inclined by an angle except for 45° with respect to perpendicular polarization directions of lights in the TE and TM modes in the detecting system integrated element. In the sixth structure, a modulation degree of the light beam is increased with respect to a DC-component of a magnetooptic differential signal in comparison with a case in which the polarization direction of the modulated light beam is set to 45° with respect to the polarization direction of light in each of the TE and TM modes. Accordingly, it is possible to obtain a magnetooptic signal having a high S/N ratio.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for recording and reading out magnetooptic information in which light reflected from a magnetooptic recording medium is detected by an integrated detection element of a waveguide type, the magnetooptic information recording and reading out apparatus comprising:

a coupler for coupling the light reflected from the magnetooptic recording medium into said integrated detection element of a waveguide type; and the integrated detection element, which element comprises:

a TE/TM mode separating element for separating the light coupled into said integrated detection element into TE and TM modes, a first waveguide photodetector for detecting the separated TE mode, and a second waveguide photodetector for detecting the separated TM mode, wherein a polarization direction of said light reflected from the magnetooptic recording medium is inclined by an angle other than 45° with respect to perpendicular polarization directions of lights in the TE and TM modes in said integrated detection element, and wherein an output $I_{TE}$ of said first waveguide photodetector is set to be approximately equal to an output $I_{TM}$ of said second waveguide photodetector.

2. A magnetooptic information recording and reading out apparatus as claimed in claim 1, wherein the output $I_{TE}$ of said first waveguide photodetector is set to be approximately equal to the output $I_{TM}$ of said second waveguide photodetector by making the coupling efficiency of said light reflected from the magnetooptic recording medium into said integrated detection element depend on the polarization direction of said reflected light.

3. A magnetooptic information recording and reading out apparatus as claimed in claim 1, wherein the output $I_{TE}$ of said first waveguide photodetector is set to be approximately equal to the output $I_{TM}$ of said second waveguide photodetector by making the waveguide transmission losses of the TE and TM modes different from each other in said integrated detection element.

4. A magnetooptic information recording and recording out apparatus as claimed in claim 1, wherein the output $I_{TE}$ of said first waveguide photodetector is set to be approximately equal to the output $I_{TM}$ of said second waveguide photodetector by making the coupling efficiency of the TE mode into said first waveguide photodetector different from the coupling efficiency of the TM mode into said second waveguide photodetector.

* * * * *